United States Patent
Chen

(10) Patent No.: US 6,600,271 B1
(45) Date of Patent: Jul. 29, 2003

(54) METHOD AND APPARATUS OF AN IMPROVED ELECTRONICS BALLAST CIRCUIT

(75) Inventor: Hong-Cheng Chen, Yantai (CN)

(73) Assignee: LapLaz Light Co. Inc., Palo Alto, CA (US)

( * ) Notice: Subject to any disclaimer, the term of this patent is extended or adjusted under 35 U.S.C. 154(b) by 0 days.

(21) Appl. No.: 09/524,306

(22) Filed: Mar. 14, 2000

Related U.S. Application Data

(63) Continuation-in-part of application No. 09/094,238, filed on Jun. 9, 1998, now Pat. No. 6,060,844.

(51) Int. Cl.$^7$ ................................................ H05B 37/02
(52) U.S. Cl. ................ 315/224; 315/247; 315/308
(58) Field of Search ............................. 315/307, 291, 315/224, 225, 247, 209 R, 308

(56) References Cited

U.S. PATENT DOCUMENTS

| | | | |
|---|---|---|---|
| 3,913,002 A | * 10/1975 | Steigerwald et al. | 315/224 |
| 5,048,033 A | 9/1991 | Donahue et al. | 315/291 |
| 5,363,020 A | 11/1994 | Chen et al. | 315/209 R |
| 5,371,440 A | 12/1994 | Liu et al. | 315/209 R |
| 5,387,848 A | 2/1995 | Wong | 315/224 |
| 5,404,082 A | * 4/1995 | Hernandez et al. | 315/291 |
| 5,412,286 A | 5/1995 | Kazi et al. | 315/244 |
| 5,428,633 A | 6/1995 | Hiroshima | 315/225 |
| 5,465,029 A | * 11/1995 | Hanazaki et al. | 315/308 |
| 5,585,700 A | 12/1996 | Ahmed | 315/307 |
| 5,612,594 A | 3/1997 | Maheshwari | 315/224 |
| 5,621,279 A | 4/1997 | Nilssen | 315/247 |
| 5,654,611 A | 8/1997 | Yamamoto et al. | 315/308 |
| 5,691,606 A | 11/1997 | Moisin et al. | 315/307 |
| 5,907,223 A | * 5/1999 | Gu et al. | 315/247 |
| 6,060,844 A | 5/2000 | Chen | 315/307 |

FOREIGN PATENT DOCUMENTS

| | | |
|---|---|---|
| DE | 4228641 A1 | 3/1994 |
| EP | 0657091 B1 | 4/1996 |
| WO | WO9522194 | 8/1995 |

\* cited by examiner

*Primary Examiner*—Don Wong
*Assistant Examiner*—Wilson Lee
(74) *Attorney, Agent, or Firm*—Ying Tuo

(57) ABSTRACT

A ballast circuit adaptive to changes in the input voltage capable of providing a "floating" high output voltage for the operation of fluorescent lamps. The present invention employs an output voltage "floating" design in adjusting the high output voltage in response to the voltage difference between the output voltage and the rectified input voltage (i.e. error voltage) without using a feedback path from the output voltage.

31 Claims, 9 Drawing Sheets

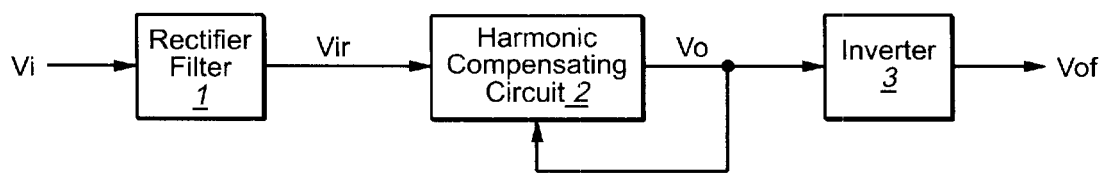
FIG._1 (PRIOR ART)
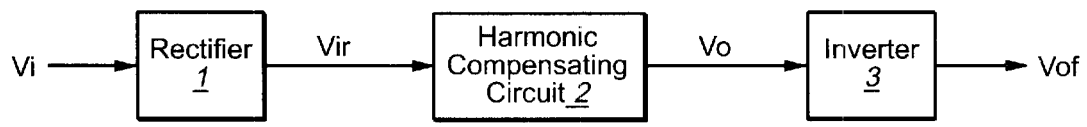
FIG._2
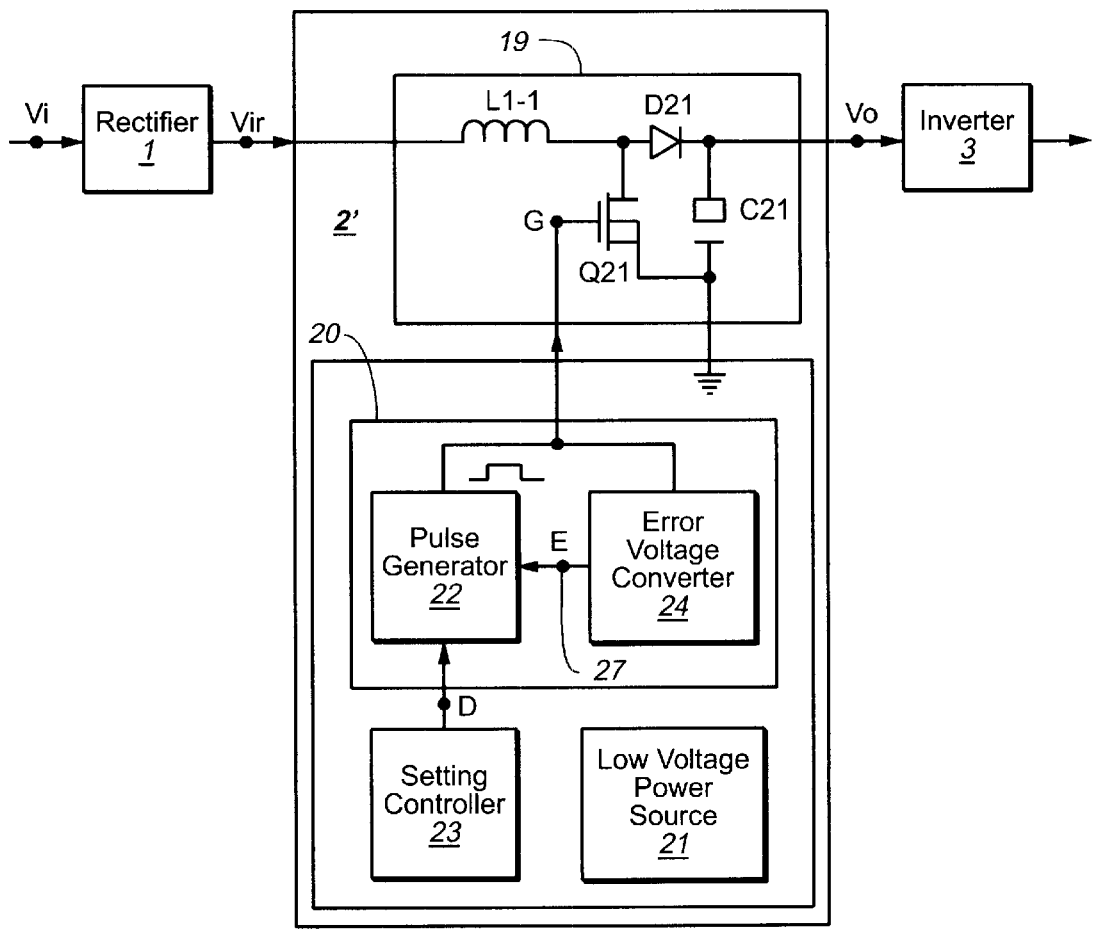
FIG._3

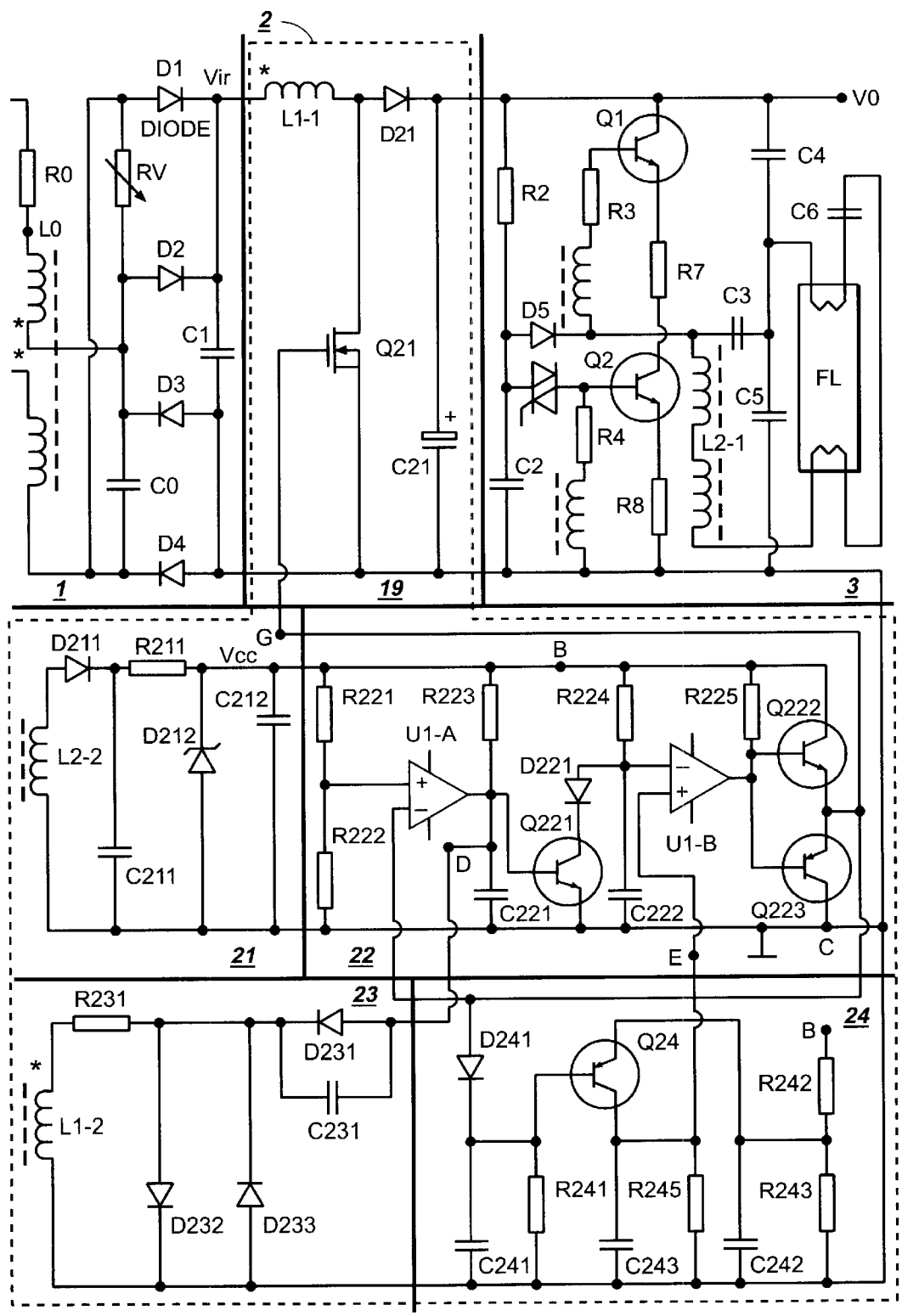
FIG._4

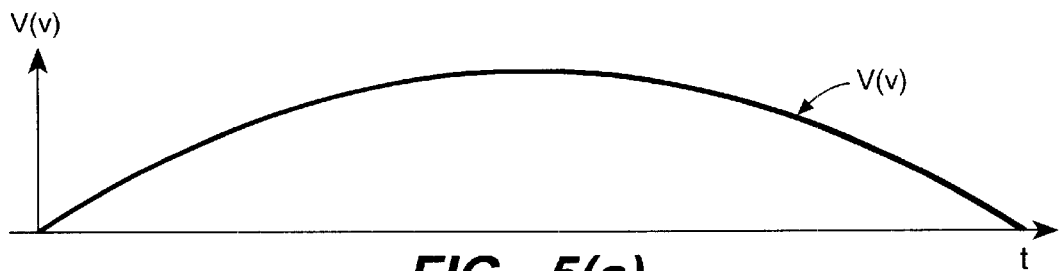
FIG._5(a)
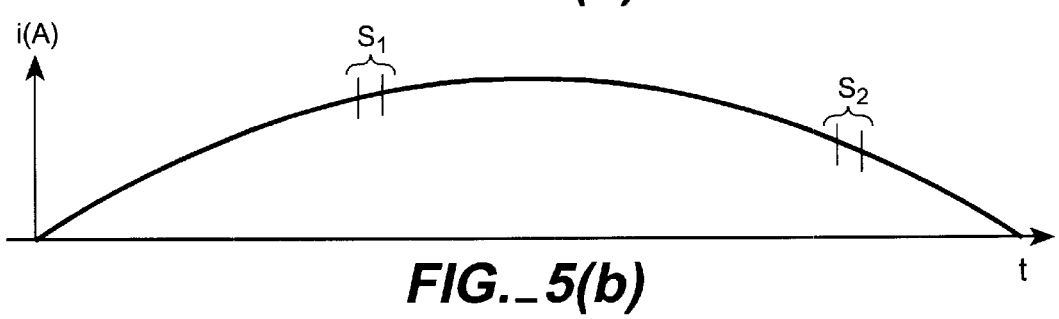
FIG._5(b)
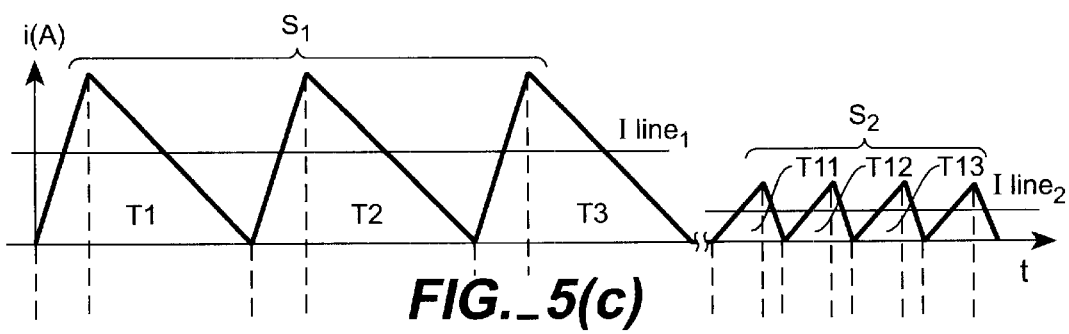
FIG._5(c)
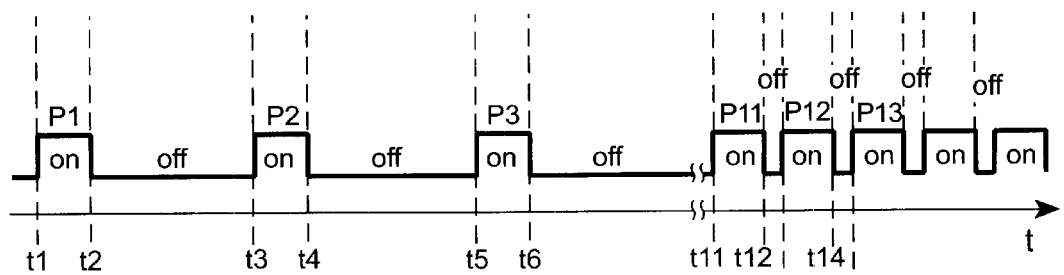
FIG._5(d)
FIG._5(e)

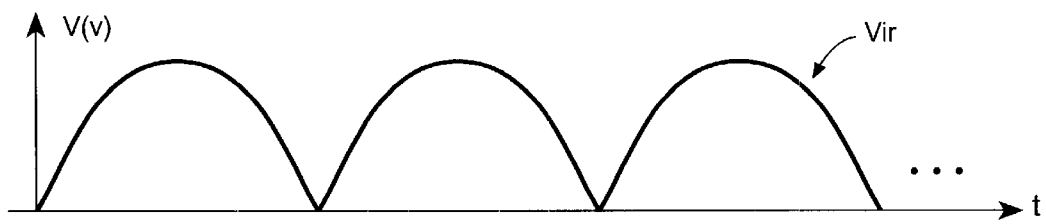
FIG._6(a)
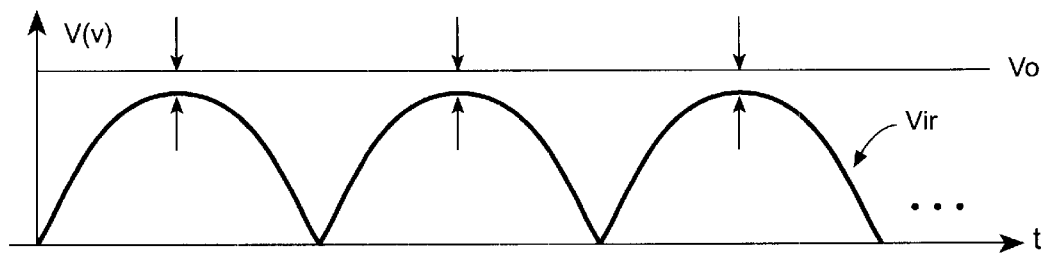
FIG._6(b)
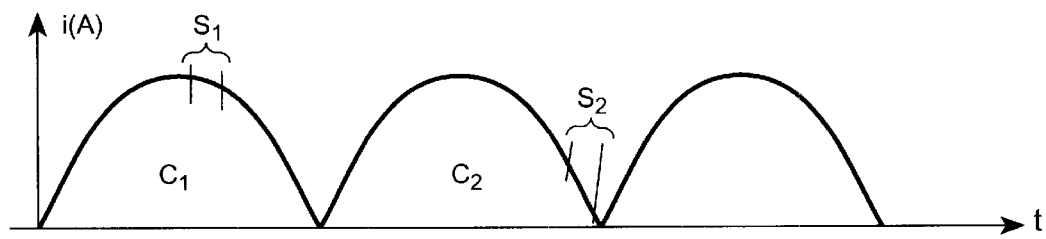
FIG._6(c)
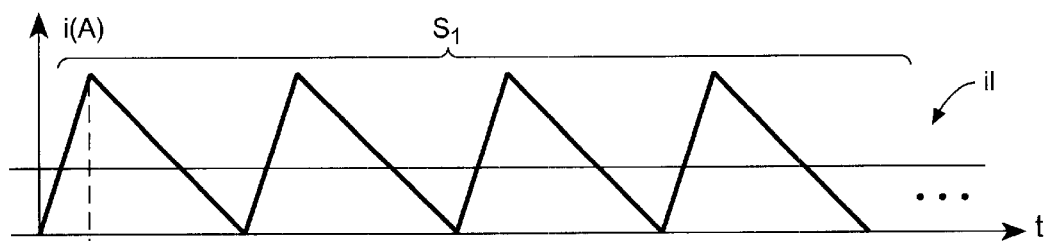
FIG. 6(d)
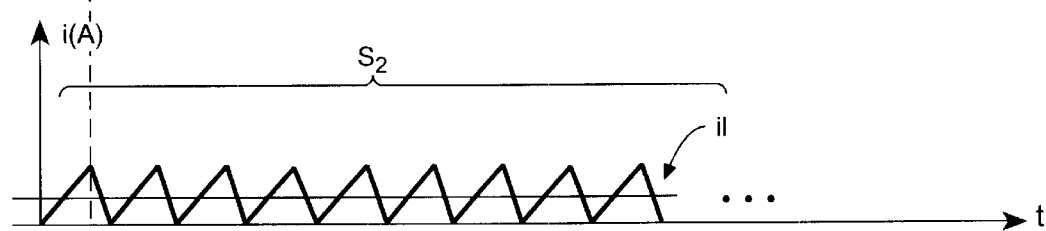
FIG._6(e)

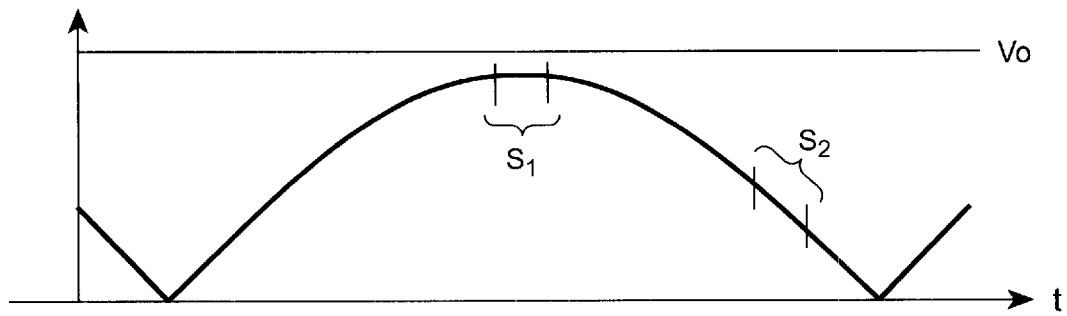
FIG._7(a)
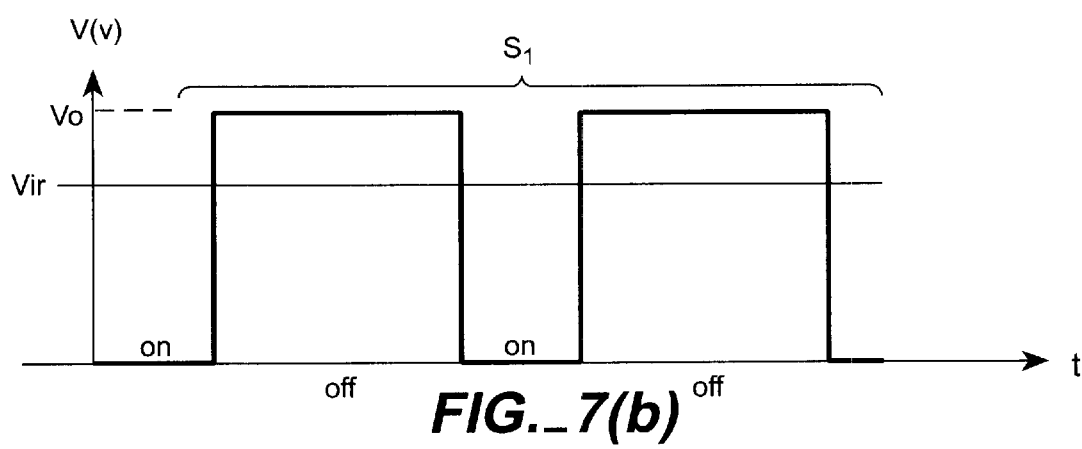
FIG._7(b)
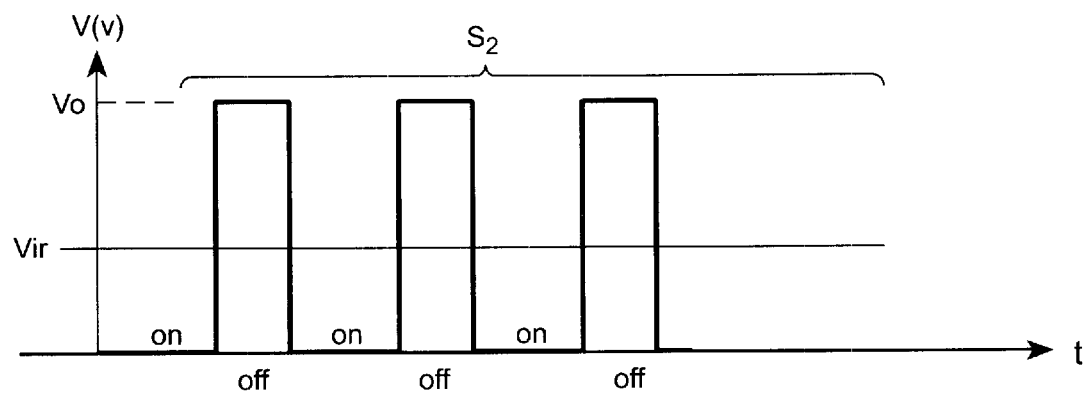
FIG._7(c)

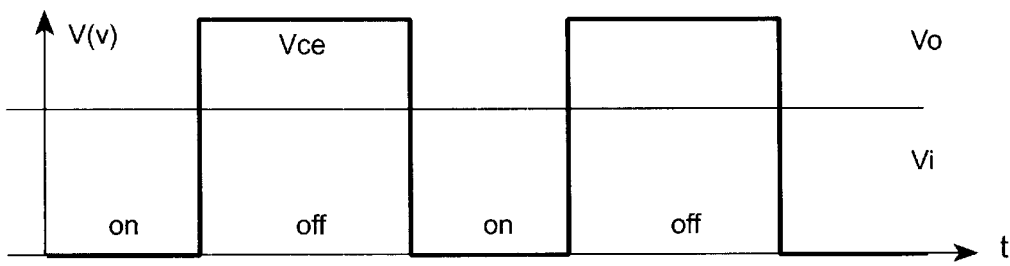
*FIG._8(a)*
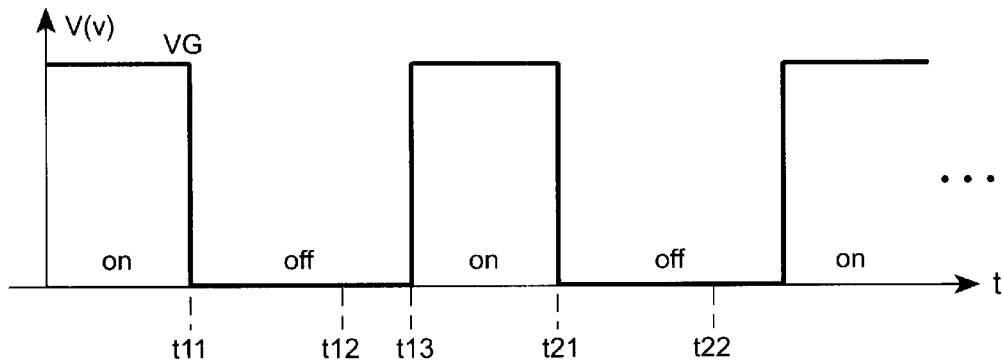
*FIG._8(b)*
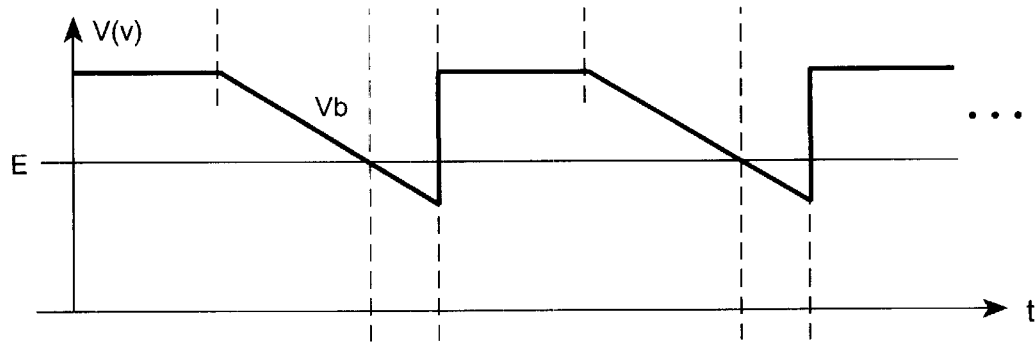
*FIG._8(c)*
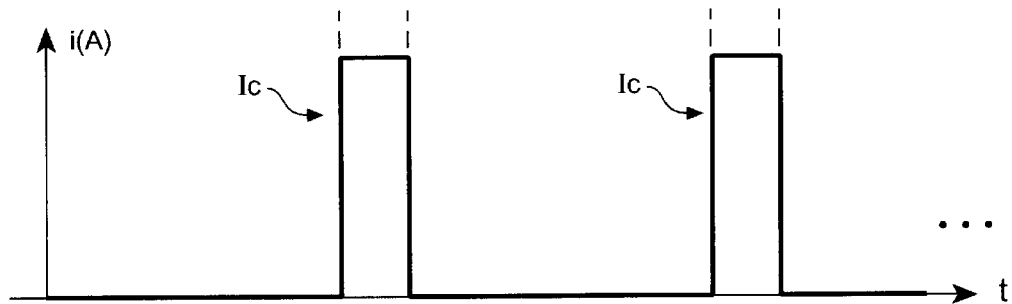
*FIG._8(d)*

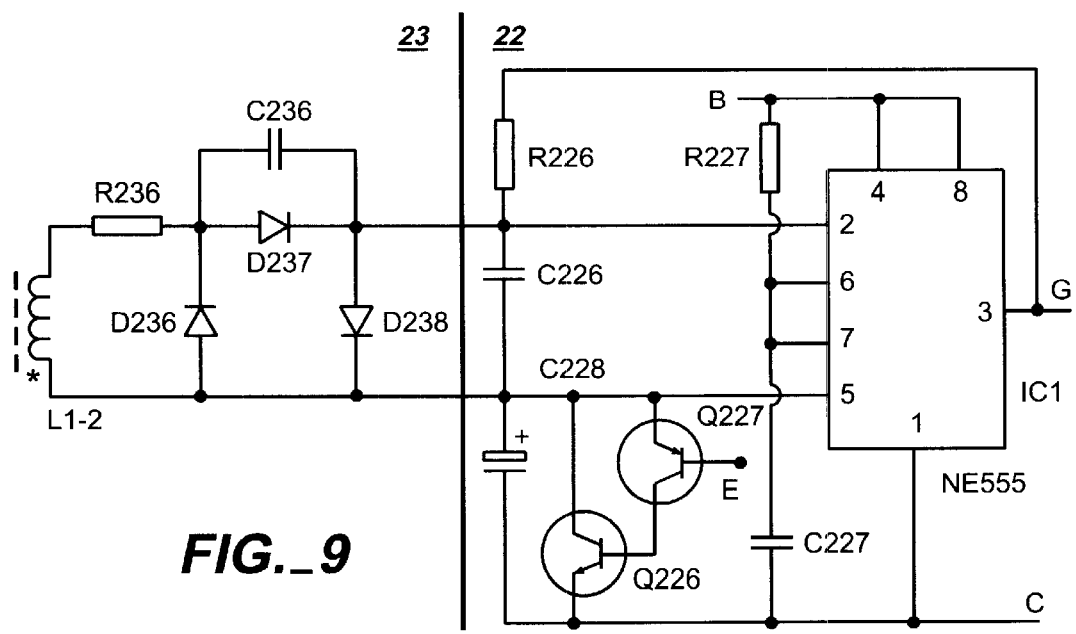
FIG._9
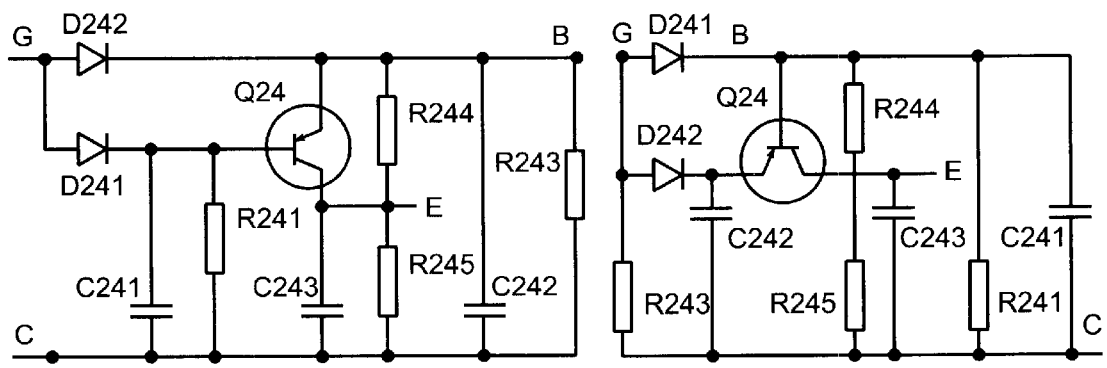
FIG._10  FIG._11
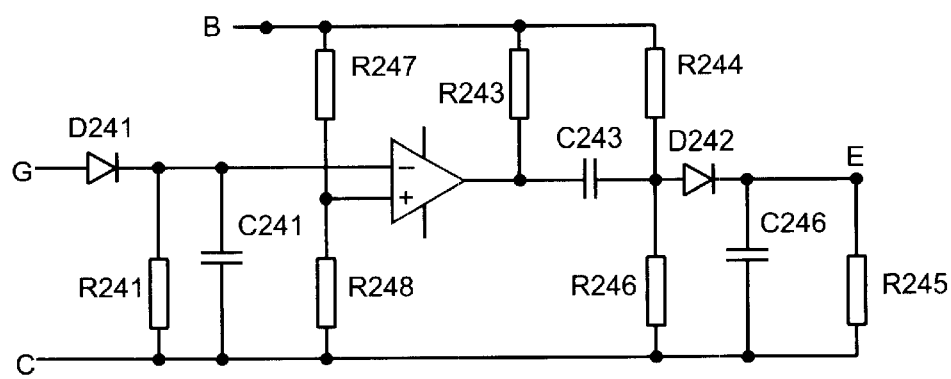
FIG._12

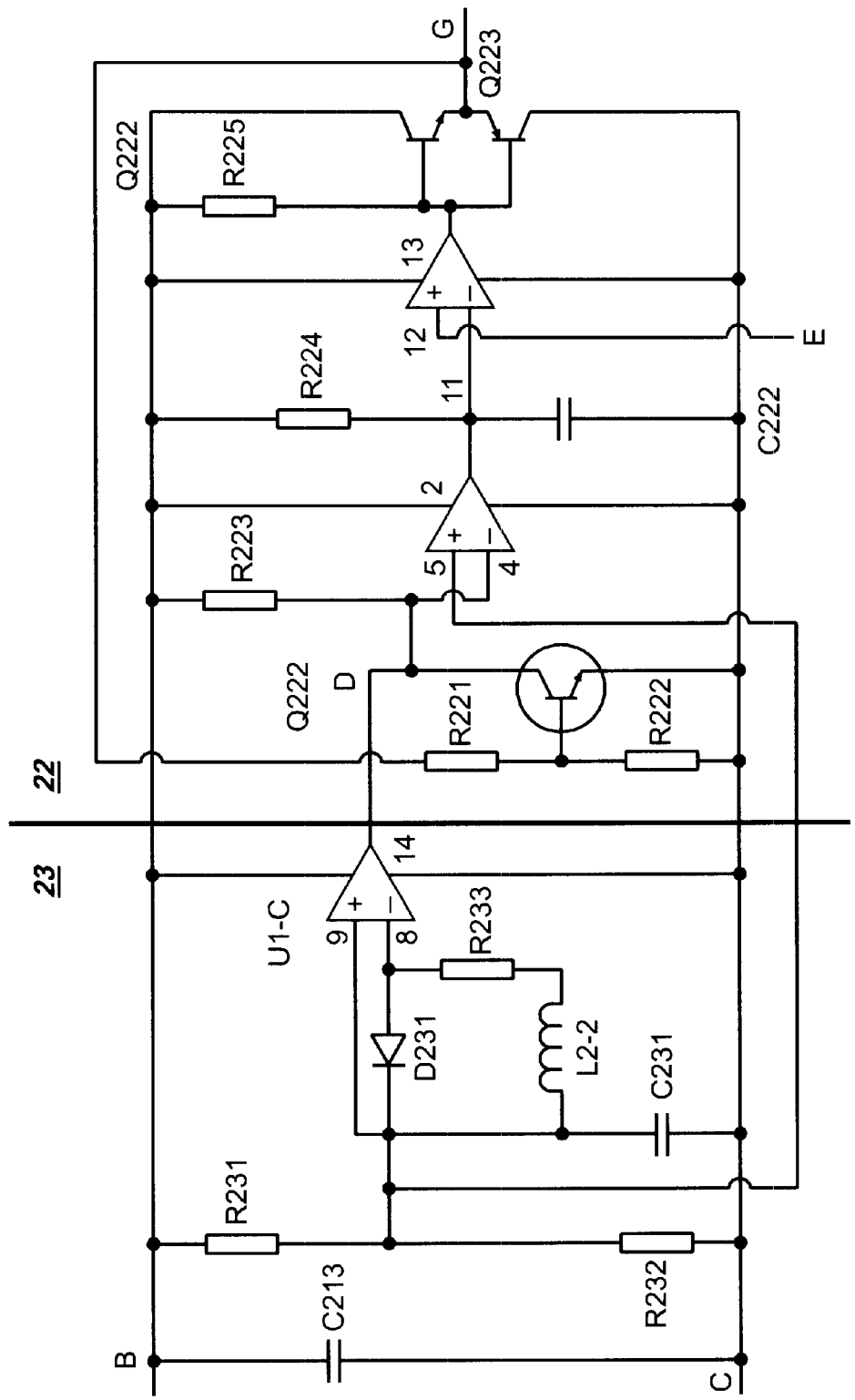
FIG._13

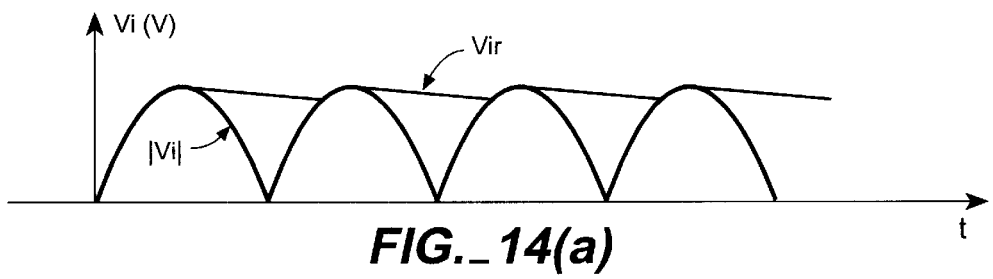
FIG._14(a)
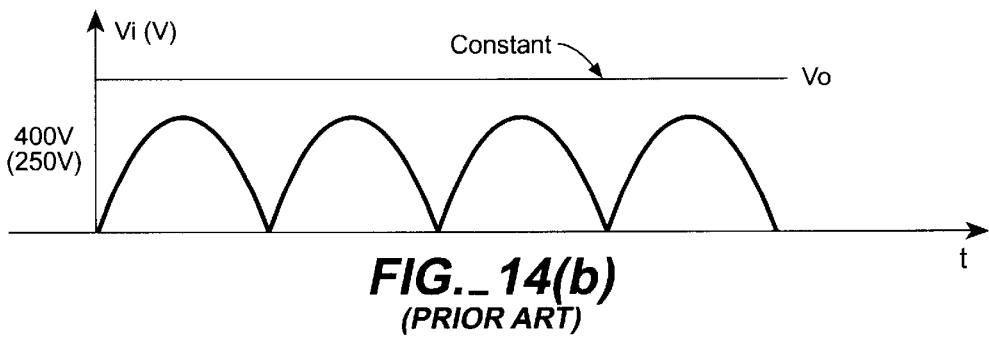
FIG._14(b)
(PRIOR ART)
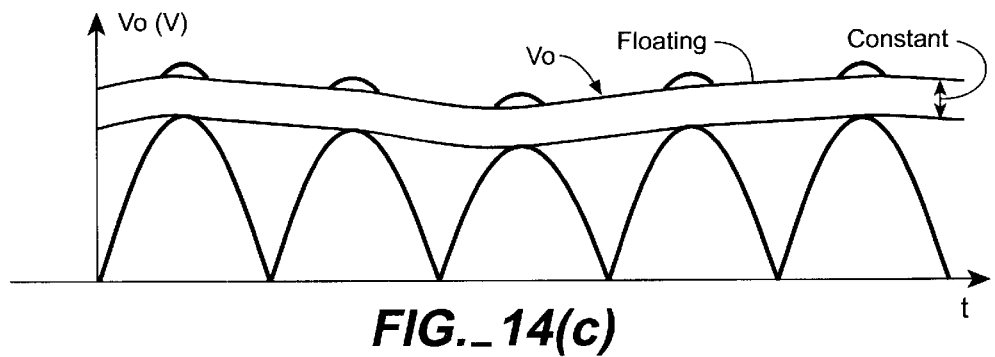
FIG._14(c)

METHOD AND APPARATUS OF AN IMPROVED ELECTRONICS BALLAST CIRCUIT

CROSS REFERENCE TO RELATED APPLICATION

This application is a continuation-in-part of U.S. patent application Ser. No. 09/094,238, filed Jun. 9, 1998 by the same inventor.

BACKGROUND OF THE INVENTION

The present invention relates to a ballast circuit for gas discharging lamps, such as fluorescent lamps or high intensity discharge (HID) lamps. More particularly, the present invention relates to a ballast circuit having a harmonic compensating circuit.

Fluorescent lamps are becoming increasingly popular for use in homes or offices because of their high operating efficiency as compared to incandescent lamps. Indeed, fluorescent lamps emit light at several times the efficiency of a typical incandescent lamp, and do not generate as much heat as a typical incandescent bulb, thereby conserving radiant energy and eliminating excess heat output.

A typical fluorescent lamp is constructed from a glass tube that contains two electrodes at opposite ends, a coating of powdered phosphor covering the interior of the tube, and small amounts of mercury. The major components of a fluorescent lamp are the bulb, electrodes, fill gas, phosphor coating and a base used to support the external conductors of the electrodes. When energized, the electrodes produce a large potential between which free electrons initiate an arc. The arc generates some visible radiation, but mostly ultraviolet radiation, which in turn excites the phosphor coating causing it to emit light. In this process, the fluorescent effect is caused by the excited mercury vaporized in the arc. A ballast circuit is requited for providing a high and constant voltage to operate the fluorescent lamp. In addition to the high voltage requirement, the ballast circuit is requited to maintain a constant current flowing to the fluorescent lamp. A conventional ballast circuit draws a current from its power supply system, which generates great quantity of harmonic current, pollutes the power supply system, and severely decreases power factor of the ballast. The above-described process of operating fluorescent lamps also applies to gas discharging lamps including HID lamps.

Furthermore, to maintain a constant DC output voltage, the conventional current control circuit typically includes a closed-feedback control loop. However, the closed-feedback design suffers low efficiency problem. For example, when a current control circuit includes a boost converter, the output DC voltage must be higher than the peak value of the input voltage, so that the boost converter can be set in a proper operating condition. Therefore, the constant output DC voltage must be set at a voltage that is higher than the maximum (or peak) value of the input voltage. Consequently, when the input voltage becomes low, the conventional ballast circuit needs to perform a large mount of energy conversion to maintain a constant output DC voltage. The more energy conversion is performed, the more self-loss is from the ballast circuit.

In addition, the output of a conventional design is highly sensitive to the accuracy of electronic components used. In the conventional ballast circuit, the high output voltage is typically controlled by resister sampling and stabilizing power source techniques. These techniques are both highly sensitive to component accuracy. Therefore, higher-grade components are needed for the conventional design and thereby the cost of volume manufacturing of the conventional ballast circuits can be prohibitive.

SUMMARY OF THE INVENTION

It is therefore an object of the present invention to provide an electronic ballast circuit that has low cost and high efficiency.

It is another object of the present invention to provide an electronic ballast circuit having an improved line current harmonic compensation and high power factor.

It is still another object of the present invention to provide an electronic ballast circuit providing output voltage that is floating in response to a wide range variations of input voltage.

It is additionally another object of the present invention to provide an electronic ballast circuit capable of self-tuning to the variations in the input voltage.

It is yet another object of the present invention to provide an electronic ballast circuit that may employ lower grade and therefore cheap electronic components.

In order to accomplish the above-mentioned objects, the present invention is directed to a ballast circuit having a harmonic compensating circuit. Specifically, the harmonic compensating circuit performs harmonic compensation in the line current in response to a signal indicative of the voltage difference between the high voltage output and the rectified input voltage (i.e. an error voltage) but without a feedback control loop.

In a preferred embodiment, the harmonic compensating circuit of the present invention employs a novel "floating" output voltage design such that the voltage difference between the output voltage Vo and a peak or near peak value of the rectified input voltage Vir remains substantially constant. By "floating" the output voltage Vo with substantially the peak value of the rectified input voltage Vir without using a feedback path from the output voltage Vo, the present invention achieves a high power factor (i.e. >95%) while being able to reduce the sensitivity of the output to the accuracy of the electronic components used.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 shows a block diagram for a conventional ballast circuit for fluorescent lamps;

FIG. 2 shows a block diagram for a ballast circuit in accordance with the present invention;

FIG. 3 shows a block diagram for the ballast circuit showing the harmonic compensating circuit 2' of FIG. 2 in greater detail, in accordance with the present invention;

FIG. 4 shows the ballast circuit shown in FIG. 3 in greater detail, in accordance with the present invention;

FIGS. 5(a)–(e) show the timing diagram within a working cycle for a section of current waves in the inductor L1-1 and a section of pulses generated by the pulse generator 22, in accordance with the present invention;

FIGS. 6(a)–(e) show the timing diagram within a plurality of working cycles for a plurality of current wave sections in the inductor L1-1, in accordance with the present invention;

FIGS. 7(a)–(c) show the timing diagram within a working cycle for a plurality of pulse sections generated by the pulse generator 22, in accordance with the present invention;

FIGS. 8(a)–(d) are timing diagrams showing waveforms in the error voltage converter 24, in accordance with the present invention;

FIG. 9 shows another embodiment of the pulse generator 22 and setting controller 23 shown in FIG. 4, in accordance with the present invention;

FIG. 10 shows another embodiment of the error voltage converter 24 shown in FIG. 4, in accordance with the present invention;

FIG. 11 shows still another embodiment of the error voltage converter 24 shown in FIG. 4, in accordance with the present invention;

FIG. 12 shows yet another embodiment of the error voltage converter 24 shown in FIG. 4, in accordance with the present invention;

FIG. 13 shows another embodiment of the pulse generator 22 and setting controller 23 shown in FIG. 4, in accordance with the present invention;

FIG. 14(a) is a timing diagram showing the input voltage Vi and the rectified input voltage Vir in a conventional ballast circuit without a voltage inverter between a rectifier and inverter;

FIG. 14(b) is a timing diagram showing the input voltage Vi, the rectified input voltage Vir, and the output voltage Vo in a conventional ballast circuit having a close-loop feedback from the output voltage Vo; and FIG. 14(c) is a timing diagram showing the input voltage Vi, the rectified input voltage Vir, and the output voltage Vo in a ballast circuit, without a feedback path from the output voltage Vo in accordance with the present invention.

DETAILED DESCRIPTION OF THE PREFERRED EMBODIMENT

FIG. 1 shows a block diagram for a conventional ballast circuit used for providing a high voltage for operating a fluorescent lamp, which is a type of a gas discharging lamp.

The ballast circuit shown in FIG. 1 comprises three parts: a rectifier 1 for converting an input voltage Vi to a rectified input voltage Vir; a harmonic compensating circuit 2 for compensating line current harmonic and converting the rectified input voltage Vir to a high output voltage Vo, and an inverter 3 for inverting the high output voltage Vo to a high frequency output voltage Vof. In the ballast circuit as shown in FIG. 1, a conventional close-loop feedback design is used for maintaining the high output voltage Vo constant by feeding the output voltage Vo back to the harmonic compensating circuit 2. Using the output voltage Vo as a feedback, the harmonic compensating circuit 2 can compensate the harmonic in the line current from the rectified input voltage so that the output voltage Vo will remain constant. It should be noted that the ballast circuit as shown in FIG. 1 suffers the problems described above.

FIG. 2 shows a block diagram for a ballast circuit in accordance with the present invention.

As shown in FIG. 2, the ballast circuit comprises a rectifier 1, a harmonic compensating circuit 2', and an inverter 3. The rectifier 1 converts an alternating current (AC) input voltage Vi into a rectified input voltage Vir. The rectified input voltage Vir is then fed into the harmonic compensating circuit 2' for compensating line current harmonic and converting the rectified input voltage Vir to a high direct current (DC) output voltage Vo. Finally, the inverter 3 converts the high DC output voltage Vo to a high frequency output voltage Vof to drive a fluorescent lamp, which is a type of gas discharging lamp. Unlike the ballast circuit shown in FIG. 1, the ballast circuit shown in FIG. 2 does not have a closed-loop feedback path from the DC output voltage Vo to the harmonic compensating circuit 2'.

FIG. 3 shows a block diagram for the ballast circuit showing the harmonic compensating circuit 2' in greater detail, in accordance with the present invention.

As shown in FIG. 3, the harmonic compensating circuit 2' comprises a boost converter 19 and a pulse width controller 20. The boost converter 19 comprises an inductor L1-1, a switch transistor Q21, a diode D21, and a capacitor C21. The pulse width controller 20 further comprises a low voltage power source 21, a pulse generator 22, a setting controller 23 and an error voltage converter 24. The pulse generator 22 generates a sequence of square pulses, the setting controller 23 controls the time at which the pulse generator 22 can be set, and the error voltage converter 24 generates a voltage VE at point E in response to an estimation of the voltage difference (error voltage) between a peak or near peak value of the rectified input voltage Vir and the output voltage Vo. The sequence of square pulses from the pulse generator 22 is fed to the gate of the transistor Q21 to turn on and off the transistor Q21. The voltage VE from the error voltage converter 24 is fed to the pulse generator 22 to adjust width (i.e. the width of the voltage level that turns Q21 on or the width of on-period time Ton) of the sequence of the square pulses. Thus, the pulse width controller 20 adjusts the width of the pulses in the sequence of square pulses that are fed to the transistor Q21 in response to the voltage difference (error voltage) between a peak or near peak value of the rectified voltage Vir and the output voltage Vo.

The operation of the ballast circuit shown in FIG. 3 is as follows:

During the off-period time Toff (i.e. when the sequence of pulses is at the voltage level that turns Q21 off) of the sequence of square pulses, the switch transistor Q21 is turned off so that the capacitor C21 is charged up by the inductor L1-1. When the error voltage (i.e. difference between Vo and peak or near peak value of Vir) increases due to a decrease in the rectified voltage Vir or an increase in the output voltage Vo, the error voltage converter 24 will reduce the voltage VE to shorten the width of the pulses in sequence of square pulses in the subsequent working cycle. During the next working cycle, because of the width decrease in the square pulses in the sequence, the switch transistor Q21 is in conducting state for a shorter period of time, thereby reducing the accumulation of magnetic energy in L1-1. Thus, when the switch transistor Q21 is turned off in the off-period Toff, the L1-1 will charge less voltage on the capacitor C21. The result is a lower output voltage Vo. By reducing the output voltage Vo to compensate for any increase of the error voltage, the error voltage will thereby remain substantially constant.

On the other hand, when the error voltage (i.e. difference between Vo and peak or near peak value of Vir) decreases due to an increase in the input voltage Vir or a decrease in the output voltage Vo, the error voltage converter 24 will increase the voltage VE to lengthen the width of the pulses sequence of square pulses in the subsequent working cycle. During the next working cycle, because of the width increase in the sequence of square pulses, the switch transistor Q21 is in conducting state for a longer period of time, thereby increasing the accumulation of magnetic energy in L1-1. Thus, when the switch transistor Q21 is turned off in the off-period Toff, the L1-1 will charge capacitor C21 to a higher voltage. The result is a higher output voltage Vo. By increasing the output voltage Vo to compensate for a decrease of the error voltage, the error voltage will thereby remain substantially constant.

It should be noted that the present invention employs an output voltage "floating" design in adjusting the voltage output in response to the voltage difference (error voltage) between the peak or near peak value of the rectified input voltage and the output voltage. In conclusion, in the "floating" output voltage design of the present invention, the error voltage is maintained substantially constant so that the ballast circuit's power efficiency remains constant. By maintaining constant power efficiency, the present invention permits the use of lower rating electronic components and allows better input voltage working range for reliability and stability. The design of the present invention is less sensitive to component accuracy which is important for mass production purposes because the manufacturing costs can be tremendously reduced by not requiring high precision components. In the preferred embodiment, the input voltage can be designed within the range of 100 V–260 VAC so that the source current harmonic is varying within 15% and the power factor is about 0.98 and above.

FIG. 4 shows the ballast circuit shown in FIG. 3 in greater detail, in accordance with the present invention.

As shown in FIG. 4, the ballast circuit comprises a rectifier 1, a harmonic compensating circuit 2', and an inverter 3. The rectifier 1 includes a transformer L0, two resistors (R0 and RV), two capacitors (C0 and C1), and four diodes (D1, D2, D3, and D4). In the rectifier 1, the resistor R0 is used for limiting the current caused by sudden input voltage change. The resistor RV is used for limiting and absorbing the disturbance caused by high voltage pulses. The capacitors C0 and C1 are used for filtering disturbances caused by high frequency pulses. The four diodes D1, D2, D3, and D4 perform rectifying function. The transformer L0 provides alternating current to the four diodes.

The inverter 3 includes two transformers (L2-1 and one that is not labeled), three resistors (R2, R3, and R7), four capacitors (C2, C3, C4, and C5), one diode (D5), and two transistors (Q1 and Q2). The R2, C2, D5, driving transformer L2-1, Q1 and Q2 form a half-bridge oscillator, in which the transistors Q1 and Q2 operate in an alternately switching mode. When one of the two transistors is turned on, the other transistor is turned off. The magnetic field changes in the driving transformer L2-1 determine the times at which one of the two transistors is turned on, and the other transistor is turned off. The L2-1 and C6 form a resonance circuit for providing a high frequency voltage to the fluorescent lamp FL, which is a type of gas discharging lamp.

The harmonic compensating circuit 2' comprises five parts, namely, a boost converter 19, a low voltage power supply 21, a pulse generator 22, a setting controller 23, and an error voltage converter 24. The boost converter 19 includes an inductor L1-1, a capacitor C21, a diode D21, and a field effect transistor Q21. The inductor L1-1 is used for storing magnetic energy generated by the current supplied by the rectifier 1. The capacitor C21 is used for storing the charge supplied by the current from the inductor L1-1. The diode D21 is used for providing a current path from the inductor L1-1 to the capacitor C21. The transistor Q21 serves as an electronic switch for turning on and off the boost converter 19. When the Q21 is turned on, a current passes through the inductor L1-1 via the Q21, so that magnetic energy is accumulated in the inductor L1-1. When the Q21 is turned off, the magnetic energy on the inductor L1-1 is transformed into a current, which in turn charges capacitor C21. Inductor L1-1 and inductor L1-2 in setting controller 23 form respectively the primary and secondary coils of a transformer.

The low voltage power supply 21 includes a resistor R211, two capacitors (C211 and C212), two diodes (D211 and D212), and an inductor L2-2. The low voltage power source 21 shown in FIG. 4 is a single diode rectifier having a zener diode D212 and a capacitor C212 acting as a filter. The low voltage power VCC is supplied by the inductor L2-2. This embodiment has the advantage over the conventional design because when the inverter circuit 3 is shut off due to a power failure, the line current compensating circuit 2' will be automatically shut off to ensure ballast circuit safety. In the preferred embodiment, the zener diode D212 rated voltage range is from 6 V to 20 V, and is usually selected from 12 V to 15 V.

The pulse generator 22 includes five resistors (R221, R222, R223, R224, and R225), two capacitors (C221 and C222), a diode (D221), two comparators (U1-A and U1-B), and three transistors (Q221, Q222 and Q223). The R221 and R222 form a voltage divider for providing an operating voltage to the U1-A. Because the U1-A receives a constant voltage $[R222/(R222+R221)] \times VCC$ at its positive input, it serves as an inverting comparator. Here, VCC is a low voltage from the L2-2. The output from the U1-A is an open collector of an internal field effect transistor (not shown). Thus, when the U1-A receives a voltage at its negative input that is lower than that at its positive input, the output voltage VD at point D is near to zero volt. When the U1-A receives a voltage at its negative input that is higher than that at its positive input, the output of U1-A is open. The R223 provides an pull-up current to the U1-A when the output of the U1-A is in an open state, and provides an operating current to the Q221. The Q221 serves as an inverter. The D221 is a 0.7 V zener diode for changing the magnitude of the input voltage at the positive input of the comparator U1-B. The C221 is a time delay capacitor. The R224 and C222 determine the width of the pulses generated by the pulse generator 22. The comparator U1-B receives a triangular or sawtooth waveform from the RC circuit R224 and C222 at its negative input and VE at its positive input. In response to these two inputs, the U1-B generates a sequence of pulses with a pulse width proximately equaling to $(R224*C222*VE)/VCC$. Thus, the pulse width can be adjusted by adjusting VE, and is directly proportional to VE. The Q222 and Q223 form a bi-directional emitter follower to amplify current for driving the Q21, and the R225 provides an operating current to Q222 and Q223.

In operation, at an initial time, the output voltage VG (i.e. at the emitters of Q222 and Q223) of the pulse generator 22 is a low level voltage, the negative input at the U1-A is near to zero volt, and the output of the U1-A is open. When the setting controller 23 allows the pulse generator 22 to be set, the time delay capacitor C221 will be charged to generate a voltage VD at point D. When VD is charged to 0.7 V, the transistor Q221 is turned on, and the timing capacitor C222 discharges a current via the Q221. Because the voltage at the positive input of the U1-B is higher than that at the negative input of the U1-B, the U1-B's output is a high voltage, which turns Q222 on and Q221 off. Thus, the output voltage VG becomes a high level voltage to turn on the Q21

Subsequently, the output voltage of the U1-A becomes a low level voltage, because the high level voltage of VG is fed back to the negative input of the U1-A. Consequently, the transistor Q221 is turned off, and the resistor R224 starts to charge the capacitor C222. When the voltage on the C222 is charged above VE, the U1-B's output becomes a low level voltage, which turns Q222 off and Q223 on. Thus, the output voltage VG becomes a low level voltage to turn off the Q21.

Afterwards, the output voltage of the U1-A becomes open again, because the low level voltage of VG is fed back to the negative input of the U1-A. When the setting controller 23 allows the pulse generator 22 to be set, the time delay capacitor 221 will be again charged to generate a voltage VD at point D. When VD is charged to 0.7 V, the transistor Q221 is turned on, and the capacitor C222 discharges a current via the Q221 When the voltage on the C222 is less than VE, the output voltage VG becomes a high level voltage again to turn on the Q21 again. The pulse generator 22 cyclically repeats this process to generate a sequence of pulses.

The setting controller 23 includes a resistor R231, a capacitor C231, three diodes (D231, D232, and D233), and an inductor L1-2. The R231 is used for limiting the current flowing through the transformer L0. The D232 and D233 are used for limiting the input voltage VD to point D within +/−0.7 V. The inductors L1-1 and L1-2 are deployed in one magnetic transformer core, such that when a current change in the L1-1 will produce a voltage in the L1-2. The D231 and C231 forms a differentiation circuit to generate a signal to set the pulse generator 22 when the current in the L1-1 decreases to zero. In operation, when the Q21 is turned on, the linear increase of the current in the L1-1 induces a positive voltage in L1-2. However, this positive voltage pulse will not affect the pulse generator 22 because the D231 is cut off. When the Q21 is turned off, the current in the L1-1 decreases linearly. The linear decrease of the current in L1-1 induces a negative voltage, which coupled to point D. While the negative voltage is coupled to point D, the pulse generator 22 cannot be set because the Q221 cannot be turned on. When the current in the L1-1 linearly decreases to zero, the pulse generator 22 can be set, because the negative voltage disappears at point D. In summary, the pulse generator 22 is allowed to be set when the current in the L1-1 decreases to zero.

The error voltage converter 24 includes four resistors (R241, R242, R243, and R245), three capacitors (C241, C242, and C243), a diode D241, and a transistor Q24. The emitter of the Q24 is coupled to R242, R243, and C242. The R242 and R243 form a voltage divider for providing a constant voltage to the emitter of the Q24, and the C242 serves a filter capacitor. The base of the Q24 is connected to the D241, C241 and R241, so that the VG can be coupled to the base through D241 and R241. The collector of the Q24 is coupled to the C243 and R245, which generate an RC output (i.e. VE) to point E. Since RC value is selected far greater than a working cycle of the line current frequency (50/60 Hz) of Vir, VE can be deemed as a constant voltage within a working cycle. The emitter of the Q24 is coupled to the R242, R243, and C242. In operation, when VG is at a high voltage level (i.e. the Q21 is on), the base of the Q24 is pulled to a high voltage level via the D241, and the C241 is charged to raise its voltage to VCC. While VG is at a high voltage level, the Q24 remains off because the voltage at the base (i.e. the voltage on the C241) is higher than that at the emitter, and the voltage on the C243 (i.e. VE) will decrease by a small amount because the C243 will not be charged at that time. When VG is at a low voltage level (i.e. the Q21 is off), the D241 is cut off, the voltage on the C241 decreases due to the discharge current from the C241 to the R241. If the off time of the Q21 is long enough such that the voltage on the C241 decreases lower than that on the emitter of the Q24, the Q24 will turn on for a short period of time. At this time, the voltage on the C243 (i.e. VE) will increase by a small amount because the charging current from Q24's collector to the C243. As will be discussed below, the length of the off-time in a pulse is determined by the voltage difference between Vir and Vo because the current decreasing speed in the L1-1 is proportional to the voltage difference. Therefore, the longest off-time in a working cycle of the line current frequency (50/60 Hz) of Vir corresponds to the smallest voltage difference between Vir and Vo within that working cycle. Within a working cycle of the line current frequency (50/60 Hz) of Vir, the voltage magnitude accumulated on the C243 due to the charging current reflects the longest off time (or the minimum voltage difference between Vir and Vo) within that working cycle.

FIGS. 5(a)–(e) show the timing diagram within a working cycle for a section of current waves in the inductor L1-1 and a section of pulses generated by the pulse generator 22, in accordance with the present invention;

FIG. 5(a) shows a voltage wave within a working cycle of the rectified input voltage Vir.

FIG. 5(b) shows a line current wave corresponding to the voltage wave shown in FIG. 5(a). A working cycle covers a plurality of pulses generated by the pulse generator 22, and the line current wave shown in FIG. 5(b) highlights two time sections, namely, a first time section S1 and a second time section S2. The first time section S1 is near to the peak value of the line current wave, while the second time section S2 is close to the valley value (0) of the line current wave.

FIG. 5(c) shows two sections of triangular or sawtooth line current waves generated in the inductor L1-1, corresponding to the first time section S1 and the second time section S2.

FIG. 5(d) shows two sections of pulses generated by the pulse generator 22, corresponding to the first time section S1 and the second time section S2.

FIG. 5(e) shows the voltage waves between the drain and source terminals of the switch transistor Q21, corresponding to the first time section S1 and the second time section S2.

The combination of FIGS. 5(c) and (d) illustrates the relationship between the line current waves and the pulses in the first time section S1, and the relationship between the line current waves and the pulses in the second time section S2. As shown in FIG. 5(d), the pulse generator 22 generates a sequence of pluses, including the first section of pulses in the first time section S1 and the second section of pulses in the second time section S2. The two sections of pulses are fed to the switch transistor Q21, corresponding to which two sections of triangular current waves are generated in the L1-1 as shown in FIG. 5(c).

In the first time section S1, at time t1 the pulse P1 jumps from zero (0) volt to a pre-determined voltage level. In response, the triangular current wave T1 starts to increase. Between t1 and t2, the pulse P1 remains at the pre-determined voltage level. In response, the Q21 is turned on, and the triangular current wave T1 gradually increases. At time t2, the pulse P1 falls from the pre-determined voltage level to zero (0) voltage level. In response, the Q21 is turned off, and the triangular current wave T1 gradually decreases. When triangular current wave T1 reaches zero (0) at t3, an inductive signal is coupled from L1-1 to L1-2 to reflect the status that the current in the L1-1 becomes zero (0). At time t3, the pulse P2 jumps from zero (0) volt to the pre-determined voltage level again. In response, the Q21 is turned on, and current in the current triangular wave gradually increases between t3 and t4. At time t4, the triangular current wave T2 starts to decrease until to zero (0). In response, the Q21 is turned off, and the triangular current wave T2 gradually decrease to zero (0) between t4 and t5. This process cyclically repeats in response to the pulses in the first time section.

In the second time section S2, at time t1 the pulse P11 jumps from zero (0) volt to a pre-determined voltage level. In response, the triangular current wave T11 starts to increase. Between t11 and t12, the pulse P11 remains at the pre-determined voltage level. In response, the Q21 is turned on, and the triangular current wave T11 gradually increases. At time t12, the pulse P12 falls from the pre-determined voltage level to zero (0) voltage level. In response, the Q21 is turned off, and the triangular current wave T11 gradually decreases. When triangular current wave T11 reaches zero (0) at t13, an inductive signal is coupled from L1-1 to L1-2 to reflect the status that the current in the L1-1 becomes zero (0). At time t13, the pulse P12 jumps from zero (0) volt to the pre-determined voltage level again. In response, the Q21 is turned on, and current in the current triangular wave gradually increases between t13 and t14. At time t14, the triangular current wave T12 starts to decrease until to zero (0). In response, the Q21 is turned off, and the triangular current wave T12 gradually decrease to zero (0) between t14 and t15. This process cyclically repeats in response to the pulses in the second time section. In FIG. 5(c), the I line1 and I line2 depict the averaged current output at the harmonic compensating circuit 2'. As shown in FIG. 5(c), the averaged current of the triangular current waves is equal to the output current at the harmonic compensating circuit 2'.

The width (i.e. on-period of the Q21) of the pulses is controlled by the voltage VE from the collector of the Q24. As noted above, the values of C243 and R245 are chosen so that VE can be deemed a constant voltage within each working cycle. Because VE can be deemed as a constant within a working cycle, the widths of all pulses within the working cycle are substantially the same. However, the off-periods of the Q21 within a working cycle can be different, depending on the current decreasing speeds of the individual triangular current waves within the working cycle. As shown in FIG. 5(d), the widths of the pulses within the first and second time sections are substantially the same. But the off-period of the pulses in the first time section is longer than from that in the second time section, because as shown in FIG. 5(c) the current decreasing speed of the triangular current in the first time section is slower than that in the second time section.

As will be apparent from FIGS. 8(a)–8(d) and 14c and the accompanying description below, in the preferred embodiment, what is kept substantially constant is the difference between Vo and the peak values of Vir in the working cycles. Since Vir is not filtered by rectifier 1, Vir will vary between 0 and its peak value during each working cycle. As will be described below, the preferred implementation of this invention alters VE to change the pulse width in response to a change in the difference between V0 and Vir where Vir is at or near its peak value, and does not respond to such change when Vir is far away from its peak value. Thus, the circuit of FIG. 4 differentiates between the difference between V0 and Vir where Vir is at or near its peak value, and the difference when Vir is away from its peak value. In the preferr3ed embodiment, this is performed by exploitation the difference in slope of the current waveform of the current in inductor L1-1 as described below.

FIGS. 6(a)–(e) show the timing diagram within a plurality of working cycles or a plurality of current wave sections in the inductor L1-1, in accordance with the present invention;

FIG. 6(a) shows rectified input voltage Vir including a plurality of voltage waves, with each of the voltage waves depicting an input voltage working cycle. FIG. 6(b) shows voltage difference between the rectified input voltage (Vir) and output voltage (Vo) at the harmonic compensating circuit 2' (see FIG. 2). As shown in FIG. 6(b), voltage difference has its smallest value at the peak of a working cycle. FIG. 6(c) shows a plurality of line current waves corresponding to the voltage waves shown in FIG. 6(a), with each of the line current waves depicting a line current working cycle. It should be noted that the first line current wave (or working cycle) L1 highlights a first time section S1, and the second line current wave (or working cycle) L2 highlights a second time section S2. The frequency of the voltage or current working cycle is typically 50 or 60 Hz.

FIG. 6(d) shows a section of line current waves in the L1-1, corresponding to the first time section shown in FIG. 6(c).

FIG. 6(e) shows a section of line current waves in the L1-1, corresponding to the second section shown in FIG. 6(d).

As shown in FIG. 5(c), and FIGS. 6(d) and (e), the current increasing speeds for all triangular current waves within a working cycle are substantially the same. However, the current decreasing speeds for the triangular current waves within a working cycle can be different, depending on the voltage difference between the Vir and Vo at a particular point of time. As the voltage difference increases, the triangular current wave decreases more rapidly to zero, and as the voltage decreases, the triangular current wave decreases more slowly to zero. For example as shown in FIG. 6(c), the triangular current wave C1 highlights a first time section S1, and the triangular current wave C2 highlights a second time section S2. Comparing the triangular current waves in FIG. 6(d) with those in FIG. 6(e), their current increasing speeds are substantially the same. However, the current decreasing speeds of the triangular current waves in FIG. 6(e) is faster than those in FIG. 6(d), because the voltage difference between Vir and Vo within the second time section S2 is bigger than that within the first time section S1. In other words, at the peak of a working cycle, its corresponding section of triangular current waves takes longest time decreasing to zero within that working cycle. In the preferred embodiment of the present invention, to reflect the voltage error between Vo and the peak or substantially the peak value of Vir in a working cycle, the error voltage converter 24 generates a control voltage VE by detecting the section of the triangular current waves that takes longest time to decrease to zero (0). The VE is then fed to the pulse generator 22 to adjust the width of the pulses in a sequence of pulses for the subsequent working cycle.

In FIGS. 6(d) and 6(e), the triangular current waves increase and decrease in linear fashion. The increasing slope of the current IL in the L1-1 equals to (voltage unit of Vir)/(inductor unit of L1-1), and the maximum current Iep in the L1-1 equals to [(voltage unit of Vir)/(inductor unit of L1-1)]×(Ton). The decreasing slope of the current IL in the L1-1 equals to (voltage unit of Vir—voltage unit of Vo)/(inductor unit of the L1-1). Because Vo and on-period Ton can both be deemed constants within a working cycle, it is directly proportional to input voltage Vir. Since the il is a sequence of triangular current waves, the average current IE of il equals to 1/(2il), which is also directly proportional to Vir. Therefore, the average value of Vir equals to the average value of il.

It should be noted that, as shown in FIGS. 6(d) and (e), the current in the inductor L1-1 is a sequence of triangular current waves, which has several advantages. In particular, it is easier to converter triangular current waves into a DC current. In addition, because a triangular current wave decreases to zero in a linear fashion, it reduces reverse recovering current and reverse recovering time to the D1-4 (shown in FIG. 4), thereby reducing the power loss on the D1-4 and Q21. Furthermore, in the present invention, because the average value of the triangular current waves equals to the average value of the rectified input voltage Vir, the harmonic in the line current from the rectifier 1 can be compensated to zero, so that the power factor of the ballast circuit of the present invention can be increased to or very close to 100%.

FIGS. 7(a)–(c) show the timing diagram within a working cycle for a plurality of pulse sections generated by the pulse generator 22, in accordance with the present invention.

The input voltage wave in FIG. 7(a) highlights two time sections, namely, a first time section S1, and a second time section S2. FIG. 7(b) shows voltage pulses across the source and drain terminals of the Q21 within the first time section S1, and FIG. 7(c) shows the voltage pulses across the source and drain terminals of the Q21 within the second time section S2. Each of the pulses consist of an on-period (i.e. Ton of a pulse or width of a pulse) and an off-period (i.e. Toff). During the on-period, the Q21 is turned on, a current passes through L1-1 via the Q21, and a triangular current wave in the L1-1 gradually increases. During the off-period, the Q21 is turned off, the magnetic energy in the L1-1 charges a current to the C21, and the triangular current wave in the L1-1 gradually decreases to zero. When the triangular current wave reaches zero, the setting controller 23 sets the pulse controller 22 to trigger a subsequent pulse. As shown in FIGS. 7(b) and (c), within a working cycle, the pulse generator 22 generates a sequence of pulses having substantially the same on-time. However, the off-time in FIG. 7(b) is longer than that in FIG. 7(c), because within the first time section S1 the current from the L1-1 charges the capacitor C21 at a lower speed; the off-time in FIG. 7(c) is shorter than that in FIG. 7(b), because within the second time section S2 the current from the L1-1 charges the capacitor C21 at a higher speed. By detecting the longest off-time in the off-times of a number of voltage pulses in a working cycle from generator 22 which corresponds to the peak of Vir in FIG. 7(a), the error voltage converter 24 adjusts VE in response to the error voltage given by the difference between Vo and the peak or near peak value of Vir, so that the width of the on-time in the subsequent cycle may be adjusted.

FIGS. 8(a)–(d) are timing diagrams showing waveforms within the error voltage converter 24, in accordance with the present invention.

FIG. 8(a) shows a diagram of voltage across the source and drain terminals of the switch transistor Q21. FIG. 8(b) shows a voltage diagram for voltage VG at point G. FIG. 8(c) shows a voltage diagram for voltage Vb on the base of the switch transistor Q21. In FIG. 8(c), the line VE shows the voltage on the emitter of the Q24. FIG. 8(d) shows a current diagram for the current flowing through the collector of the Q24. As shown in FIG. 8(c), in a working cycle, when a section of the longest off-periods (Toff) comes, Vb starts to decrease at the end of each of the on-periods in that working cycle. Specifically, Vb starts to decrease at t11, or t21, . . . . As shown in FIG. 8(d), the Q24 will not be turned on until Vb decreases below VE at t12, or t22, . . . . One or more pulse currents will flow through the collector of the Q24 when the Q24 is turned on. Corresponding to some sections of off-periods (Toff), the Q24 may be not turned off, because the off-periods in these sections are not long enough to allow Vb to decrease below VE. The appearance and non-appearance of the pulse currents at the collector of the Q24 charges and discharges the capacitor C243, determining increase or decrease of voltage VE that controls the widths of the sequences of pulses generated by the pulse generator 22.

FIG. 9 shows another embodiment of the pulse generator 22 and setting controller 23 shown in FIG. 4, in accordance with the present invention. The main difference between this design and that in FIG. 4 is that the design here uses an integrated timer NE555 to control the pulse generator.

In this embodiment, the pulse generator 22 comprises an integrated timing circuit, NE555 (IC1), for generating the sequence of square pulses. Due to the use of the integrated circuit, the pulse generator overall design is greatly simplified. The setting controller 23 comprises an energy storing inductance L1-2, a limiting resister R236, two clamping diodes D2336, D2138, a voltage limiting zener diode D237, and a trigger capacitor C236. The integrated timing circuit NE555 is low pulse activated so that the polarity of the diode D237's is different from the embodiment as shown in FIG. 6. In this preferred embodiment, the capacitor C236 is around 10 pf. In the NE555 integrated circuit, terminal 1 is the DC ground; terminal 2 is the input, which is effective to a negative level pulse, for trigging the timing circuit; terminal 3 is the output of the timing circuit; terminal 4 chip is the re-set input terminal; terminal 5 is the output terminal for the internal comparators; terminal 6 is the on-timing input terminal for connecting external timing resistor and external timing capacitor; terminal 7 is the internal feedback output terminal. It turns on when output voltage VG is at a low voltage level; and terminal 8 the low voltage power supply. Because terminal 2 is connected to the output VG at point G via the R226, the timing circuit in FIG. 9 can be triggered by VG when the setting controller 22 allows. The Q226 and Q227 are used to lower the load of the error voltage converter 24.

FIG. 10 shows another embodiment of the error voltage converter 24 shown in FIG. 4, in accordance with the present invention. There are two differences between this embodiment and the embodiment as shown in FIG. 4. First, the locations of the capacitor C242 for the two embodiments are different. In this embodiment, this capacitor C242 is directly charged at point G. In addition, the initial voltage of the capacitor C243 is biased by the resistors R244 and R245 whereas the capacitor C243 in the previous embodiment is biased by the resistor R245 alone. Therefor, this preferred embodiment requires a larger resistor R241 to provide the appropriate bias voltage for the normal operation of the voltage converter 24. In FIG. 10, the collector of the PNP transistor Q24 is connected to the VG at point G through the D242. The base of Q24 is connected to VG at point G through the D241. In operation, when VG is at a high voltage level (i.e. the Q21 is on), the D241 and 242 are in conducting state. The base and emitter of Q24 are both pulled up to a high voltage level, and the timing capacitor 241 and the collector capacitor 243 are both charged to a high voltage level. While VG is at a high voltage level, the Q24 remains off because the voltage at the base (i.e. the voltage on the C241) equals to that at the collector, and the voltage on the C243 (i.e. VE) will decrease by a small amount because the C243 will not be charged at this time. When VG is at a low voltage level (i.e. the Q21 is off), the D241 and D242 are cut off. The voltage on the emitter of the Q24 changes very little because the capacitance of the C242 is large enough to maintain this voltage. At this time, the timing capacitor C 241 discharges a current through the timing resistor 242. When the off time of Q21 is short, the voltage on Q24's base decreases by a small amount at the end of the off time. This voltage is high enough to keep the Q24 off, and the voltage on the capacitor 243 will change very little because the capacitor will not be charged. If the off time of the Q21 is long enough such that the voltage on the C241 decreases lower enough, the Q24 will turn on for a little period of time. At this time, the voltage on the C243 (i.e. VE) will increase by a little because the charging current from Q24's collector to the C243. As will be discussed above, within a working cycle, the voltage magnitude accumulated on the C243 reflects the longest off time within that cycle.

FIG. 11 shows another embodiment of the error voltage converter 24 shown in FIG. 4, in accordance with the present invention. In this embodiment, the voltage at point G is biased by the resistors R242 and R243. This embodiment requires a smaller capacitor C242 than the embodiment as shown in FIG. 4. The capacitor C242 in this embodiment is around 1 nF whereas the capacitor required in FIG. 6 is around 10 nF.

FIG. 12 shows another embodiment of the error voltage converter 24 shown in FIG. 4, in accordance with the present invention. In this embodiment, the reference voltage Vref is controlled by adjusting the values of the R241, C241, R247 and R248. For example, in the preferred embodiment as shown, the resistors R234, R246, R244, and R245 are 4.7K, 47K, 470K, and 4.7M respectively. The capacitors C243 and C246 are around 1 uF. The positive input of the comparator U1-C is connected to a constant voltage provided by the R247 and R248. The negative input of the comparator U1-C is connected to VG at point G through the D241.

In operation, when VG is at a high voltage level (i.e. the Q21 is on), the C241 is charged up to a high voltage level through the diode D241. While the negative input is at a high voltage level, the U1-C is turned on to generate a low level voltage, because the voltage level at the negative input of the U1-C is higher than that at the positive input of the U1-C. When VG is at a low voltage level (i.e. the Q21 is off), the diode D241 is cut off, and the voltage on the C241 decreases due to the discharging current from the C241 to the resistor R241. If the offtime is long enough such that the voltage on the C241 is decreased to a level lower than that at the positive input, the U1-C will be turned off to generate a positive pulse, which in turn raises the voltage on the C246 (i.e. VE) by a small amount due to a charge current to the C241 through the D242. The maximum voltage magnitude accumulated on the C241 within a working cycle reflects the longest off time within that working cycle.

FIG. 13 shows another embodiment of the pulse generator 22 and setting controller 23 shown in FIG. 4. The setting controller 23 in FIG. 13 uses a comparator U1-C to control the time at which the pulse generator 22 can be set, thus providing more accurate time control to the pulse generator 22. The pulse generator 22 in FIG. 13 substitutes a comparator (see U1-A in FIG. 4) with a transistor Q222, and a transistor (see Q221 in FIG. 4) with a comparator 2.

FIG. 14(a) is a timing diagram showing the input voltage Vi and the rectified input voltage Vir in a conventional ballast circuit without a voltage converter between a rectifier and a inverter. As shown in FIG. 14(a), the rectified input voltage Vi should be a constant voltage having an amplitude equal to the peak voltage of Vi.

FIG. 14(b) is a timing diagram showing the input voltage Vi, the rectified input voltage Vir, and the output voltage Vo in a conventional ballast circuit having close-loop feedback from the output voltage Vo. In FIG. 14(b), the diagram illustrates the key characteristic of the conventional close-loop feedback design: the output voltage Vo remains constant notwithstanding changes of the input voltage Vi.

FIG. 14(c) is a timing diagram showing the input voltage Vi, the rectified input voltage Vir, and the output voltage Vo in the ballast circuit without having a feedback path from the output voltage Vo, in accordance with the present invention. The diagram illustrates the key characteristic of the "floating" output voltage design of the present invention: instead of maintaining the output voltage Vo constant as in the conventional design which generates the timing diagram shown in FIG. 14b, the error voltage (i.e. Vo-Vir) is maintained substantially constant. In other words, the output voltage Vo "floats" with (or follows) changes of the rectified input voltage Vir.

As mentioned above, in a preferred embodiment, each working cycle covers a sequence of pulses applied to the gate of transistor Q21, and the pulse widths in different working cycles are adjusted in response to the voltage differences between Vo and a peak or near peak value of Vir. The pulse adjustment process is summarized as follows. The adjustment of the pulse width is allowed in a subsequent working cycle based on the difference between Vo and a peak or near peak value of Vir of the previous working cycle, and no adjustment is made within a working cycle based on such difference of that cycle. In order to distinguish between a peak or near peak value of Vir and one that is not during the same working cycle, the invention utilizes the slope or speed of change of the current in inductor L1-1. Within a particular working cycle, the widths (i.e. Ton) of the pulses applied to the gate of transistor Q21 in that working cycle are substantially the same. Each pulse causes a triangular shaped current wave to be generated in the inductor L1-1. Corresponding to a small time section of a graph of the line current wave over time (which has the same shape as the wave form of rectified voltage Vir) during a working cycle, the current in L1-1 has a triangular or sawtooth shape, where time taken by the current in L1-1 to rise from a low point to the top in the small time section of the triangular waveform is determined by the widths of the corresponding pulses applied to the gate of Q21, and where time taken by the current in L1-1 to fall from the top to a low point in the triangular waveform is determined by the voltage difference between Vo and Vir. Where the small time section is at or near the peak of the line current (and therefore of Vir) in the working cycle, the voltage difference between Vo and Vir is at or near the minimum, and where the small time section is at or near the lowest value in the valley of the line current (and therefore of Vir) in the working cycle, the voltage difference between Vo and Vir is at or near the maximum. A subsequent pulse to the gate of Q21 is triggered when a triangular current wave in L1-1 corresponding to the previous pulse decreases to zero (0). Therefore Toff time of the pulses in the sequences of pulses applied to the gate of Q21 is determined by the voltage difference between Vir and Vo. In the present invention, the longest Toff times in one or more time sections occurring around a peak voltage of Vir within a working cycle are used to adjust control voltage VE, which are in turn used to adjust the width of a subsequent sequence of pulses in next working cycle. Since the control voltage VE at a particular time reflects the voltage difference between Vo and a peak or near peak value of Vir, the pulse widths are adjusted reflecting the voltage differences between Vo and a peak or near peak value of Vir in different working cycles.

It is to be understood that while the invention has been described above in conjunction with preferred specific embodiments, the description and examples are intended to illustrate and not limit the scope of the invention, which is defined by the scope of appended claims.

What is claimed is:

1. A ballast circuit, having a rectifier for converting an alternating input voltage to a rectified input voltage, comprising:

a voltage boost circuit for generating the output voltage in response to the rectified input voltage;

a switching circuit, coupled to the voltage boost circuit, for controlling the boost circuit;

a pulse generating circuit, coupled to the switching circuit, for generating a sequence of pulses, the pulses having their respective widths, each of the pulses controlling switching on and switching off time of the switching circuit; and a voltage control circuit, coupled to the pulse generating circuit, for controlling the widths of the pulses in response to a voltage difference between the rectified input voltage and the output voltage.

2. The ballast circuit of claim 1, wherein the widths of the pulses are adjusted, so that the change of the output voltage is responsive to the change of the rectified input voltage causing the difference between the rectified input voltage and the output voltage to be within a predetermined range.

3. The ballast circuit of claim 1, further comprising a voltage detecting circuit for detecting the voltage difference.

4. The ballast of claim 1, wherein the output voltage is floating with the rectified input voltage.

5. The ballast circuit of claim 1, wherein the output voltage is responsive to the widths of the sequence of pulses.

6. The ballast circuit of claim 1, wherein the widths of the sequence of pulses are responsive to the voltage difference between the rectified voltage and the input voltage.

7. The ballast circuit of claim 1, wherein the boost circuit further comprising:

a current circuit for generating a current; and a voltage circuit, coupled to the current circuit, for receiving the current and generating the output voltage;

wherein the voltage control circuit further comprises a voltage detecting circuit for detecting the voltage difference in response to the current that is charged from the current circuit to the voltage circuit.

8. The ballast circuit of claim 7, wherein:

the current circuit is an inductor; and the voltage circuit is a capacitor;

wherein the voltage detecting circuit detects the voltage difference by detecting the current that is charged to the capacitor from the inductor.

9. The ballast circuit of claim 7, wherein the current circuit generates the current comprising a sequence of triangular current waves.

10. The ballast circuit of claim 9, wherein an average value of the triangular current waves equals to an average value of the current of the input voltage.

11. The ballast circuit of claim 7, further comprising:

a setting circuit for setting the pulse generating circuit when the current reaches a predetermined value.

12. The ballast circuit of claim 7 further comprising:

a current detecting means for detecting whether the current reaches a predetermined value.

13. The ballast circuit of claim 1, wherein the output voltage is at least 180 volts.

14. A device, including a rectifier for converting an alternating input voltage to a rectified input voltage, comprising:

a voltage boost circuit for generating an output voltage in response to the rectified input voltage, the voltage boost circuit including a current circuit for generating a current, a voltage circuit coupled to the current circuit for receiving the current and generating the output voltage, and a switching circuit, coupled to the current circuit for controlling current circuit;

a pulse generating circuit, coupled to the voltage boost circuit, for generating a sequence of pulses, the pulses having their respective widths, each of the pulses controlling switching on and switching off time of the switching circuit; and a control circuit, coupled to the voltage boost circuit and the pulse generating circuit, for determining a voltage difference between the rectified input voltage and the output voltage in response to the current in the current circuit, and for adjusting the widths of the pulses in response to the voltage difference.

15. The device of claim 14, wherein:

the current circuit is an inductor; and the voltage circuit is a capacitor.

16. The device of claim 14, wherein the current circuit generates the current comprising a sequence of triangular current waves.

17. The device of claim 16, wherein an average value of the triangular current waves equals to an average value of the current of the input voltage.

18. The device of claim 14, further comprising:

a setting circuit for setting the pulse generating circuit when the charging current reaches a predetermined value.

19. The device of claim 14, wherein the widths of the pulses are adjusted, so that the change of the output voltage is responsive to the change of the rectified input voltage causing the difference between the rectified input voltage and the output voltage to be within a predetermined range.

20. The device of claim 14, wherein the output voltage is floating with the rectified input voltage.

21. The device of claim 14, wherein the output voltage is responsive to the widths of the sequence of pulses.

22. The device of claim 14, wherein the widths of the sequence of pulses are responsive to the voltage difference between the rectified voltage and the input voltage.

23. A device, including a rectifier for converting an alternating input voltage to a rectified input voltage, comprising:

a voltage boost circuit for generating an output voltage in response to the rectified input voltage, the voltage boost circuit including a current circuit for generating a current, a voltage circuit coupled to the current circuit for receiving the current and generating the output voltage, and a switching circuit, coupled to the current circuit for controlling current circuit;

a pulse generating circuit, coupled to the voltage boost circuit, for generating a sequence of pulses in a working cycle, the pulses having their respective widths, each of the pulses controlling switching on and switching off time of the switching circuit; and a control circuit, coupled to the voltage boost circuit and the pulse generating circuit, for determining a voltage difference between the rectified input voltage and the output voltage in response to the widths of the sequence of pulses in the working cycle, and for adjusting the widths of the pulses in a subsequent working cycle in response to the voltage difference.

24. The device of claim 23, wherein:

the current circuit is an inductor; and the voltage circuit is a capacitor.

25. The device of claim 23, wherein the current circuit generates the current comprising a sequence of triangular current waves.

26. The device of claim 25, wherein an average value of the triangular current waves equals to an average value of the current of the input voltage.

27. The device of claim 23, further comprising:
a setting circuit for setting the pulse generating circuit when the charging current reaches a predetermined value.

28. The device of claim 23, wherein the widths of the pulses are adjusted, so that the change of the output voltage is responsive to the change of the rectified input voltage causing the difference between the rectified input voltage and the output voltage to be within a predetermined range.

29. The device of claim 23, wherein the output voltage is floating with the rectified input voltage.

30. The device of claim 23, wherein the output voltage is responsive to the widths of the sequence of pulses.

31. The device of claim 23, wherein the widths of the sequence of pulses are responsive to the voltage difference between the rectified voltage and the input voltage.

* * * * *